(12) United States Patent
Fujio (10) Patent No.: US 10,669,104 B2
(45) Date of Patent: Jun. 2, 2020

(54) GOODS TRANSPORT FACILITY

(71) Applicant: DAIFUKU CO., LTD., Osaka-shi, Osaka (JP)

(72) Inventor: Yoshihiko Fujio, Shiga (JP)

(73) Assignee: DAIFUKU CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 16/346,169

(22) PCT Filed: Sep. 7, 2017

(86) PCT No.: PCT/JP2017/032353
§ 371 (c)(1),
(2) Date: Apr. 30, 2019

(87) PCT Pub. No.: WO2018/088012
PCT Pub. Date: May 17, 2018

(65) Prior Publication Data
US 2019/0263597 A1    Aug. 29, 2019

(30) Foreign Application Priority Data

Nov. 14, 2016   (JP) .................................. 2016-221090

(51) Int. Cl.
*B65G 47/40*     (2006.01)
*B65G 35/06*     (2006.01)
(Continued)

(52) U.S. Cl.
CPC ............. *B65G 35/06* (2013.01); *B65G 47/40* (2013.01); *B61B 13/00* (2013.01); *B65G 63/00* (2013.01); *E01B 5/16* (2013.01)

(58) Field of Classification Search
None
See application file for complete search history.

(56) References Cited

U.S. PATENT DOCUMENTS 779,964 A    1/1905   Porter
1,003,330 A  9/1911   Bzsan
(Continued)

FOREIGN PATENT DOCUMENTS

JP   04-083003 A   3/1992
JP   05-311601 A   11/1993
(Continued)

OTHER PUBLICATIONS

International Search Report from corresponding International Patent Application No. PCT/JP17/32353, dated Dec. 12, 2017.
(Continued)

*Primary Examiner* — Kavel Singh
(74) *Attorney, Agent, or Firm* — Kusner & Jaffe (57) ABSTRACT

A goods transport facility for transporting goods along a transportation path including a curved part, and in particular a goods transport facility provided with a plurality of transport carriages that move along a pair of left and right rails, which are provided along the transportation path, so as to transport goods. A rail width adjusting mechanism capable of changing a rail width between the left and right rails and is provided in at least one of a curving region and an S-curve region in the curved part of the transportation path.

4 Claims, 11 Drawing Sheets

(51) Int. Cl.
  *B65G 47/00* (2006.01)
  *B61B 13/00* (2006.01)
  *E01B 5/16* (2006.01)
  *B65G 63/00* (2006.01)

(56) References Cited

U.S. PATENT DOCUMENTS

| | | | |
|---|---|---|---|
| 3,706,371 A | 12/1972 | Hirota | |
| 5,823,316 A * | 10/1998 | Shaw | B23P 21/004 |
| | | | 198/341.04 |
| 6,378,695 B1 * | 4/2002 | Rinne | B65G 21/2072 |
| | | | 198/836.3 |
| 9,376,271 B2 * | 6/2016 | Fujio | B65G 47/962 |
| 10,239,697 B2 * | 3/2019 | Lakhotia | B65G 17/066 |
| 10,532,895 B1 * | 1/2020 | Best | B60D 1/02 |
| 2016/0046453 A1 | 2/2016 | Fujio et al. | |

FOREIGN PATENT DOCUMENTS

| | | |
|---|---|---|
| JP | 2001-193003 A | 7/2001 |
| JP | 2010-222911 A | 10/2010 |
| JP | 2014-198620 | 10/2014 |

OTHER PUBLICATIONS

Extended European Search Report, dated Nov. 6, 2019, in the corresponding European Patent Application No. 17869157.2.

* cited by examiner

GOODS TRANSPORT FACILITY

TECHNICAL FIELD

The present invention relates to a goods transport facility for transporting goods along a transportation path and particularly relates to a goods transport facility provided with a plurality of transport carriages that move along a pair of left and right rails, which are provided along a transportation path, so as to transport goods.

BACKGROUND ART

If a goods transport facility for transporting goods has a predetermined goods transportation path, rails may be provided along the transportation path and a plurality of transport carriages may be prepared so as to move along the rails. The transport carriages move along the rails while supporting goods, so that the goods are transported along the transportation path. Such a goods transport facility is used for transporting, for examples, passengers' baggage between an aircraft and a terminal building at an airport.

Japanese Patent Laid-Open No. 2014-198620 ("Patent Literature 1") discloses a goods transport facility where a plurality of coupled transport carriages move along a loop traveling path. In the goods transport facility of Patent Literature 1, the transport carriage travels along a pair of left and right traveling rails provided along a traveling path. The transport carriage further includes a limiter that limits a movement of the transport carriage in the width direction of the carriage (a lateral direction with respect to the transport direction of goods). The limiter is a rotating body (roller) that can rotate about a vertical axis. The limiter is provided on the left and right (sides) of the transport carriage. Hereinafter the limiter will be referred to as a side roller. The side roller comes into contact with the inner surface of the traveling rail so as to limit a lateral movement of the transport carriage. This prevents the transport carriage from separating from the transportation path.

SUMMARY OF INVENTION

Technical Problem

Figure 8:
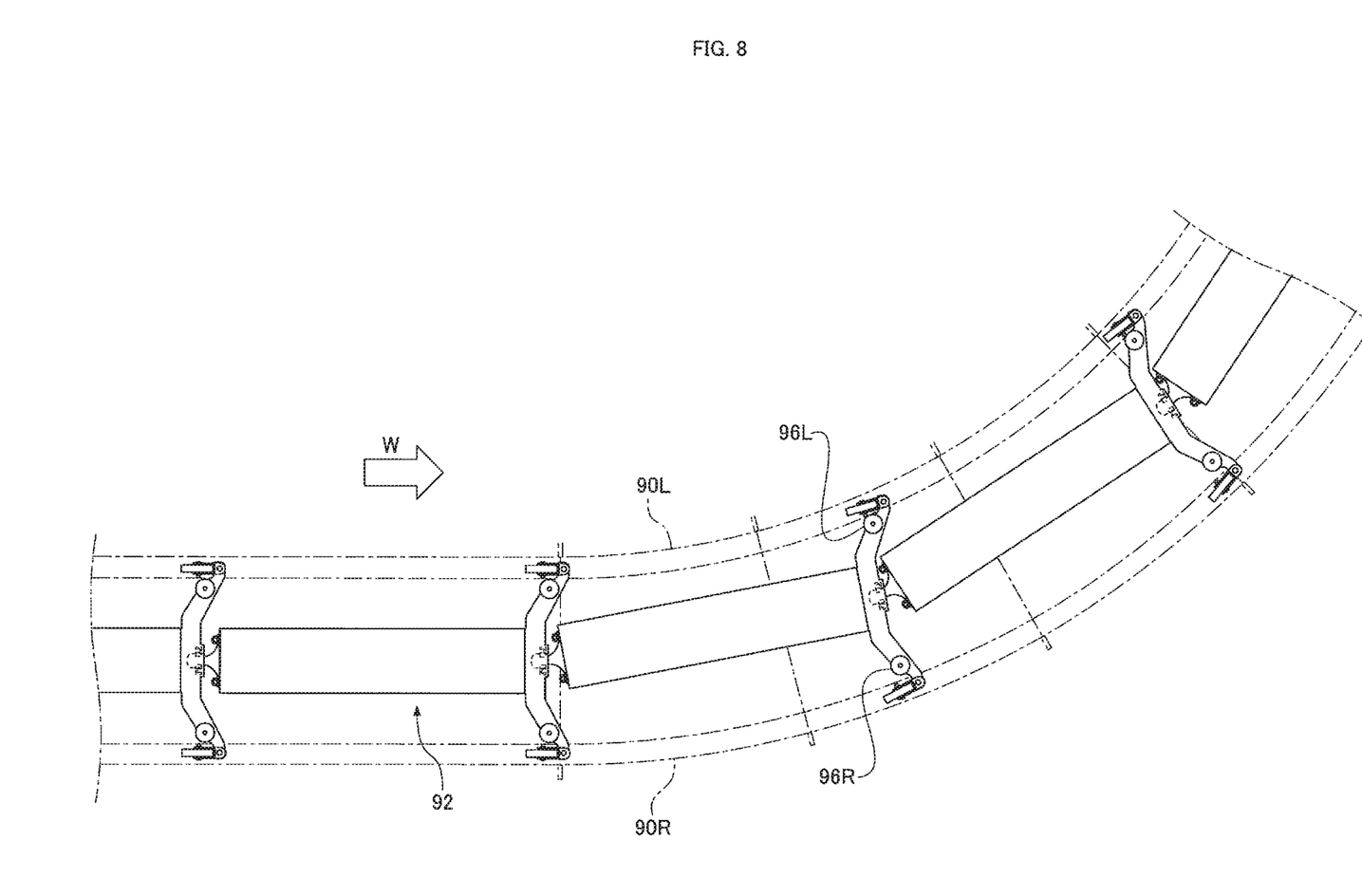
FIG. 8 is a plan view showing the orientations of transport carriages in a transition region from a linear part to a curved part in a goods transport facility of the related art.

In the goods transport facility described in Patent Literature 1, unfortunately, the side roller colliding with the rail may make noise. As shown in FIG. 8, when a transport carriage 92 travels on a curved part in a transportation path in the goods transport facility, side rollers 96L and 96R provided on the left and right of the transport carriage 92 come into contact with the sides of left and right rails 90L and 90R, thereby preventing the transport carriage 92 between the rails 90L and 90R from moving out of the rails. In this configuration, the side rollers 96L and 96R strongly colliding with the rails 90L and 90R make noise. The level of noise depends on the impact strength of the collision of the side rollers 96L and 96R with the rails 90L and 90R.

As shown in FIG. 8, in a transition region from a linear part to a curved part of the transport path, the side roller 96L disposed on the inner side of a curve (the left side of the traveling direction) comes into contact with the inner rail 90L, though the side rollers 96L and 96R are slightly separated from the rails 90L and 90R in a linear part. The side roller 96L and the rail 90L in a linear part are separated from each other only, with a small gap. Thus, when the transport carriage 90 enters a curved part and the inner side roller 96L comes into contact with the inner rail 90L, the side roller 96L does not make a strong impact, resulting in a low noise level.

Figure 9:
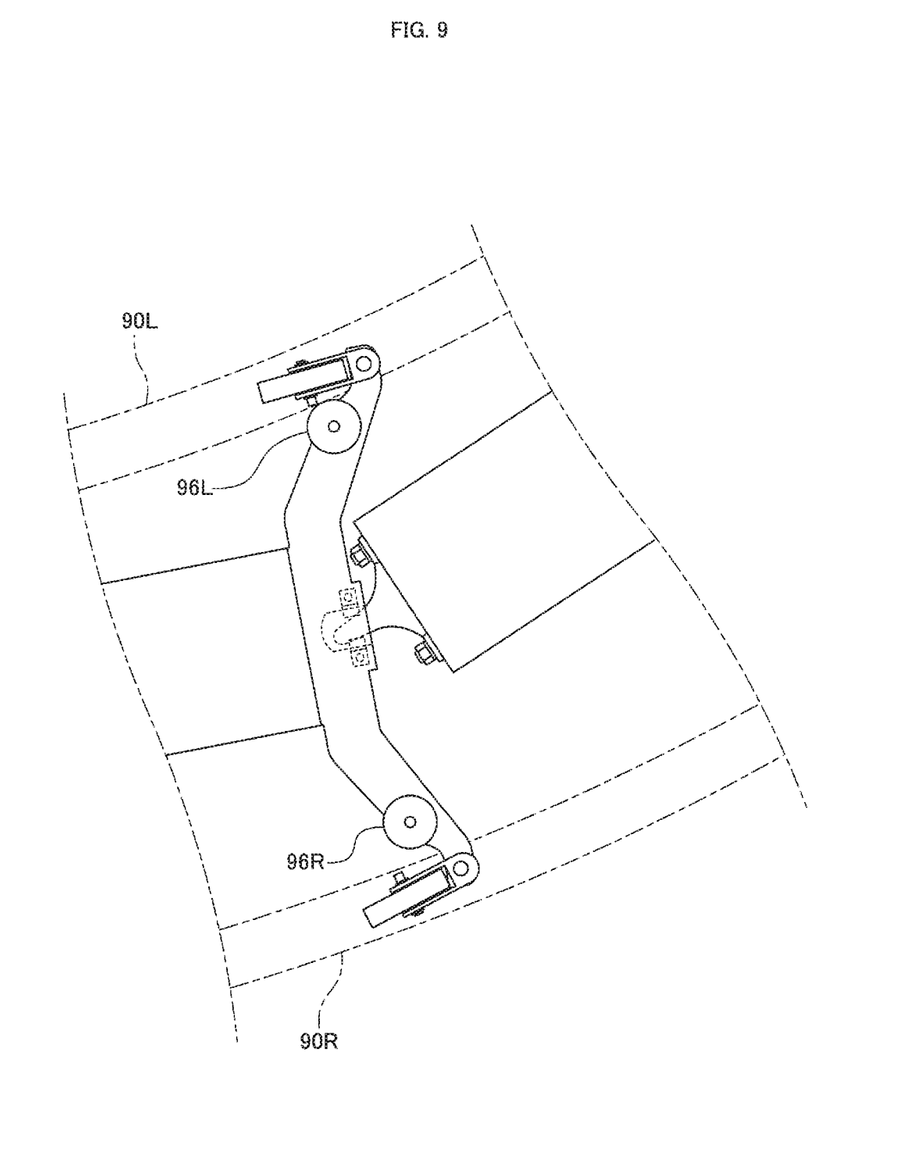
FIG. 9 is an enlarged view of FIG. 8 with a right side roller largely separated from a right rail.

However, as shown in FIG. 9, the outer side roller 96R (on the right side of the traveling direction) is largely separated from the outer rail 90R while the inner side roller 96L travels in contact with the inner rail 90L. This is because a line connecting the left and right side rollers 96L and 96R in a curved part inclines with respect to the normal line of the transportation path. When the transport carriage 92 with the outer side roller 96R largely separated from the outer rail 90R passes through a curved part and then enters a linear part again, the side roller 96R largely separated from the rail 90R moves toward the rail 90R with a strong impact. Thus, the side roller 96R may collide with the rail 90R and cause large noise. Moreover, noise may be generated in a curved part with a tension applied to the transport carriage 92. Specifically, a tension applied among the transport carriages 92 (a tension applied from the preceding or subsequent transport carriage 92) coupled over the transportation path always increases or decreases (stretching and loosening are alternately repeated) according to the position and orientation of the transport carriage 92 in the transportation path. The transport carriages 92 passing through a curved part also become less tense (become loosened) for a moment. If a tension applied to the transport carriage 92 decreases while the outer side roller 96R is largely separated from the outer rail 90R as shown in FIG. 9, the transport carriage 92 is moved outward by a centrifugal force. This causes the outer side roller 96R largely separated from the outer rail 90R to collide with the rail 90R with a strong impact, thereby generating loud noise.

Figure 10:
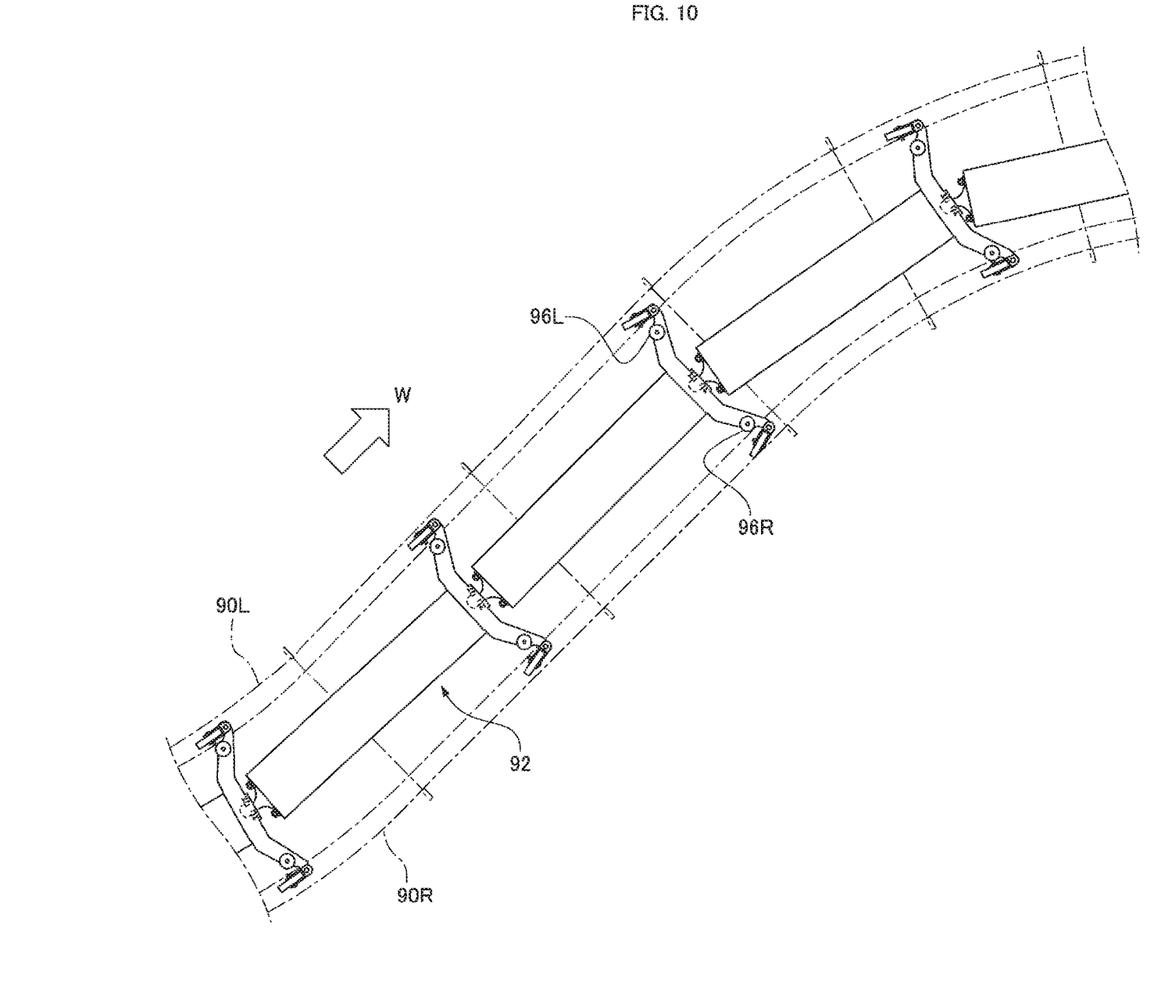
FIG. 10 is a plan view showing the orientations of the transport carriages in a region where the direction of a curve changes in a curved part, in the goods transport facility of the related art.
Figure 11:
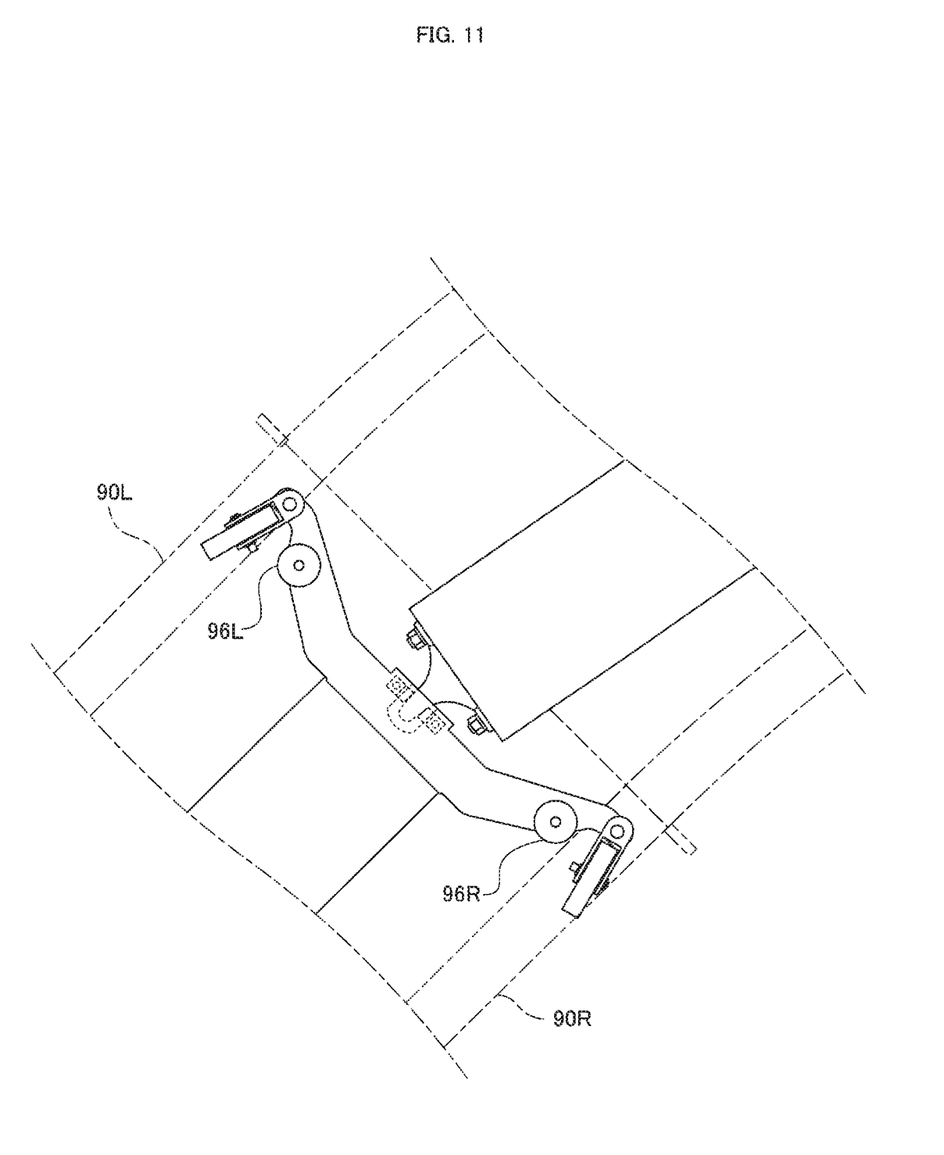
FIG. 11 is an enlarged view of FIG. 10 with a left side roller largely separated from a left rail.

Moreover, in a curved part, loud noise may occur in a region where the direction of a curve changes (a region where a left curve turns into a right curve with respect to the traveling direction) as shown in FIG. 10. This is because the side rollers on the left and right alternately come into contact with the rail in this region. Specifically, in a left curve part, the side roller 96L on the left comes into contact with the left rail 90L as in the state of FIG. 9. In a right curve part, as shown in FIG. 11, the side roller 96R on the right comes into contact with the right rail 90R. Thus, in the region of FIG. 10, the side roller 96R on the right largely separates from the right rail 90R temporarily as in the state of FIG. 9 and then collides with the right rail 90R with a strong impact as in the state of FIG. 11. At this point, loud noise occurs.

In this way, in the goods transport facility of the related art, noise occurs due to the collision of the side roller with the rail in a curved part of the transportation path. If the transportation path is designed with a gradually changing curvature radius, the side rollers 96L and 96R do not strongly collide with the rails 90L and 90R, thereby reducing noise. However, such a transportation path may have a larger transition region from a linear part to a curved part or a curved part may have a larger region where the direction of a curve changes. Thus, noise reduction requires a large space in the facility and limits the flexibility of the layout of the transportation path.

An object of the present invention is to provide a goods transport facility that can reduce noise generated by the collision of a side roller with a rail in a curved part of a transportation path and does not limit the flexibility of the layout of the transportation path.

Solution to Problem

In order to solve the problem, in a goods transport facility for transporting goods along a transportation path including a linear part and a curved part, a goods transport facility according to the present invention includes a pair of left and right rails provided along the transportation path and a plurality of transport carriages configured to move along the rails so as to transport goods, in which each of the transport carriages includes a carriage body that supports the goods, a pair of left and right wheels that rotate while being supported by the top surfaces of the rails, and a pair of left and right side rollers that are located so as to face the sides of the rails and limit a lateral movement of the carriage body, and each of the transport carriages is coupled to the preceding and subsequent transport carriages in a swinging manner so as to be a train of the transport carriages consecutively traveling along the transportation path, and a rail width adjuster capable of changing a rail width between the left and right rails is provided in at least one of a curving region being transition from the linear part to the curved part while the transport carriages entering the curved part of the transportation path and a region where the direction of a curve changes in the curved part.

With this configuration, the rail width can be changed in a region where a gap between the side roller of the transport carriage and the rail is likely to increase. Thus, a reduction in rail width leads to a smaller gap between the side roller and the rail in the region. This prevents the side roller from colliding with the rail with a strong impact in a large gap between the side roller and the rail, thereby reducing noise. By preventing the side roller from separating from the rail particularly with a sufficiently reduced rail width, the collision of the side roller with the rail is prevented from generating noise.

In addition to the configuration, the goods transport facility of the present invention may be configured such that a gap between a pair of left and right positioning members fixed to the respective left and right rails is changed by the rail width adjuster so as to change the rail width.

With this configuration, the pair of left and right rails is not directly moved but the positioning members fixed to the rails are moved instead. Thus, a change of the rail width does not affect the shapes of the top surfaces of the rails where the wheels of the transport carriages are supported and the shapes of rail sides that face the side rollers.

In addition to the configuration, the goods transport facility of the present invention may be configured such that the pair of left and right positioning members is yoke halves for coupling the left and right rails.

With this configuration, the positioning members can be provided only by cutting a yoke provided for a pair of left and right ordinary rails. Thus, even if rails are provided in a facility without positioning members, positioning members and rail width adjusters can be additionally provided for the rails later.

In addition to the configuration, the goods transport facility of the present invention is preferably configured such that the rail width adjuster is located so as to change a rail width at a position where a gap between the rail and the side roller is larger than that of the linear part.

With this configuration, the rail width can be changed particularly at a position where a gap between the rail and the side roller increases, thereby efficiently reducing noise. Furthermore, it is not necessary to provide the rail width adjuster over a transition region from the linear part to the curved part and a region where the direction of a curve changes, and the rail width adjuster is necessary only at a position where the side roller is more largely separated from the rail than in a linear part. This minimizes the number of rail width adjusters and reduces the cost of constructing the goods transport facility.

Advantageous Effects of Invention

According to the goods transport facility of the present invention, the rail width can be changed in a region where a distance between the rail and the side roller is likely to increase. Since the rail width is reduced in the region, the side roller is not largely separated from the rail over the transportation path. This prevents the side roller from colliding with the rail with a strong impact, thereby reducing noise. Even in a short transition region from a linear part to a curved part or a short region where the direction of a curve changes in a curved part, large noise is not generated. This eliminates the need for extending these regions to reduce noise, thereby increasing the flexibility of the layout of the transportation path.

DESCRIPTION OF EMBODIMENTS

Figure 1:
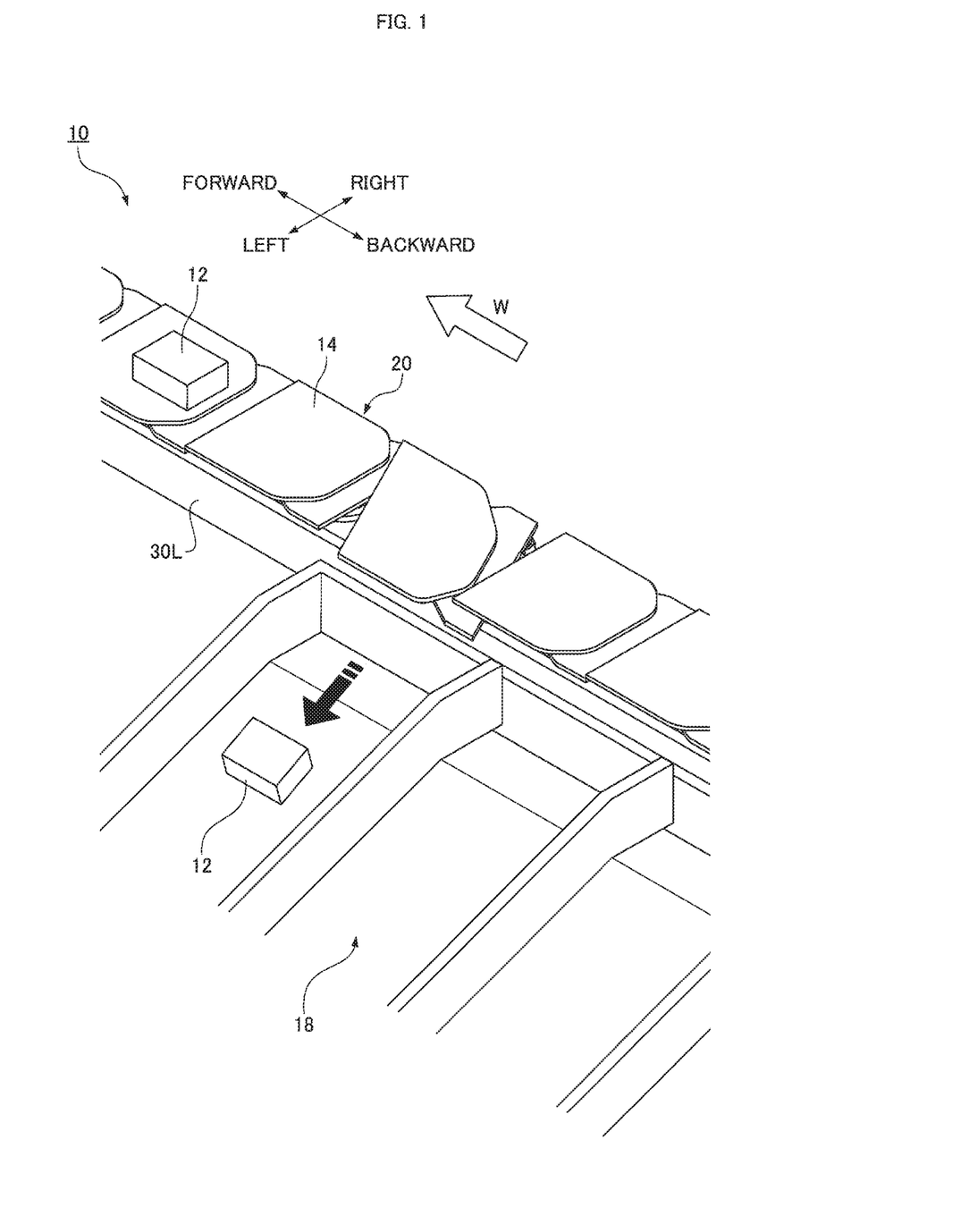
FIG. 1 is a perspective view showing transport carriages in a goods transport facility as an example of an embodiment of the present invention.

FIG. 1 shows transport carriages 20 that transport goods 12 along a transportation path in a goods transport facility 10 illustrated as an example of an embodiment of the present invention. In the goods transport facility 10, the transport carriages 20 are linearly disposed along the transportation path. In this configuration, a direction along the transportation path will be referred to as a longitudinal direction and a direction orthogonal to the transportation path will be referred to as a lateral direction or a width direction. As indicated by arrows in FIG. 1, all directions including a forward direction along a transport direction W (the transport direction of the goods 12) are determined (FORWARD/ BACKWARD/LEFT/RIGHT). Each of the transport carriages 20 includes a tray 14. The transport carriage 20 is moved (caused to travel) in the transport direction W by a drive unit, which is not shown, so that the goods 12 to be transported is placed on the tray 14 during transportation.

The transport carriage 20 can laterally tilt the tray 14 with respect to the transport direction W (FIG. 1 only shows the tray 14 inclined to the left). The tray 14 is tilted so as to discharge the goods 12 placed on the top surface of the tray 14 to any one of chutes 18 disposed on the left and right of the transportation path. The chutes 18 are connected to the respective destinations. Moreover, the operation of the transport carriage 20 is controlled so as to discharge the goods 12 on the tray 14 into the chute 18 connected to the destination of the goods 12. In this way, the transport carriages 20 can transport the goods 12 to the respective destinations.

Figure 2:
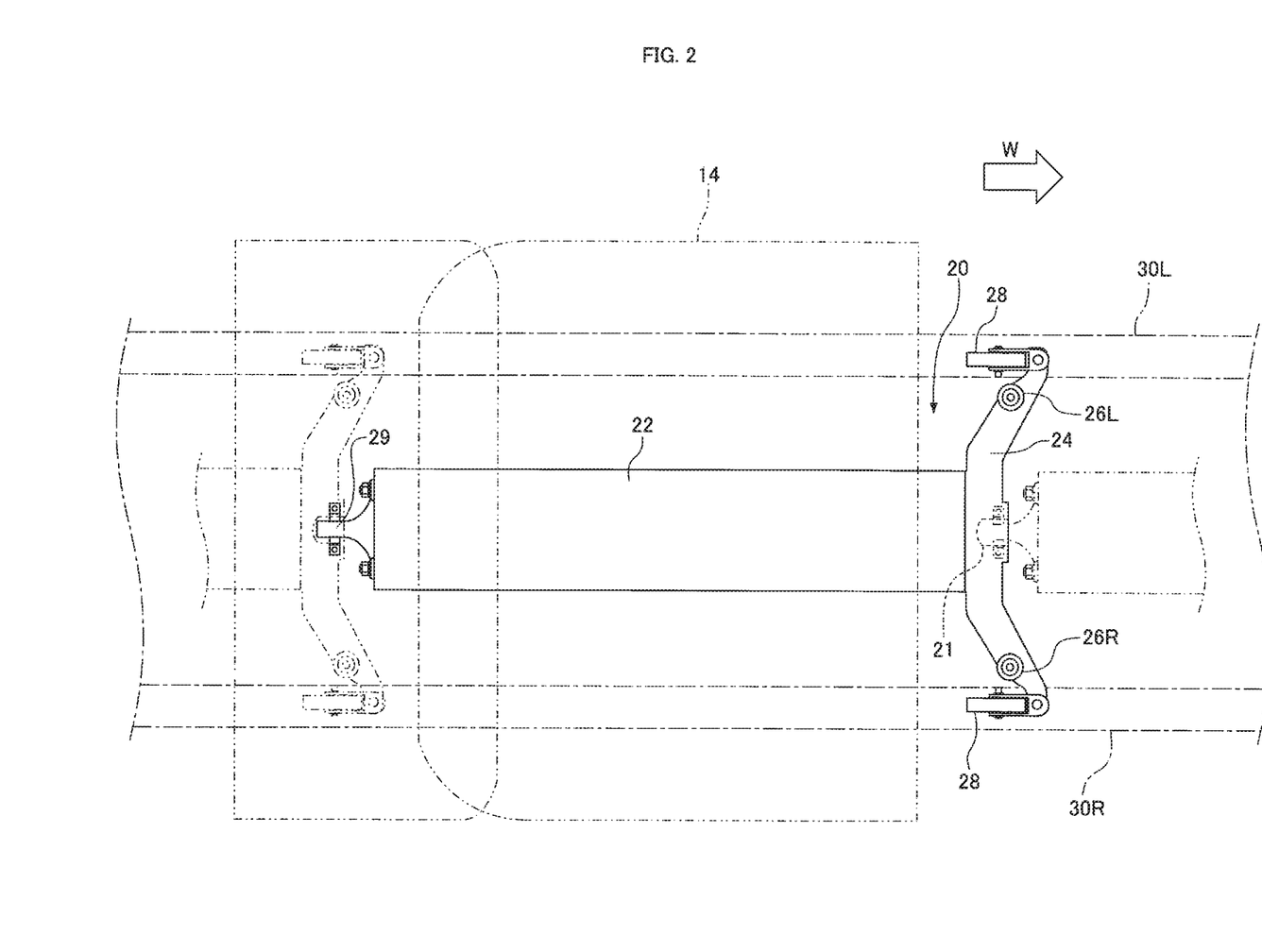
FIG. 2 is a plan view showing the transport carriage of the present embodiment.

FIG. 2 is a plan view of the transport carriage 20. The transport carriage 20 has a carriage body 22. The carriage body 22 supports the goods 12, which is shown in FIG. 1, via the tray 14 and moves along a pair of left and right rails 30L and 30R provided along the transportation path. The rails 30L and 30R and the tray 14 in FIG. 2 are indicated by virtual lines to ensure ease of viewing of the shape of the carriage body 22.

The carriage body 22 is substantially shaped like a rectangular plate longitudinally extended along the transport direction W. The rear end of the carriage body 22 (the rear end in the transport direction W serving as a forward direction) is coupled to the front end of another transport carriage 20 via a coupler 29. The transport carriages 20 longitudinally disposed (next to each other) along the transport direction W are coupled so as to vertically and horizontally swing with respect to the coupler 29. Thus, even if the transport carriages 20 travel on a curved part or an ups and downs in the transportation path, a train of the transport carriages 20 can consecutively travel along the transportation path. Furthermore, a tilting device (not shown in FIG. 2) that serves as the base of the tray 14 and laterally tilts the tray 14 is provided on the top surface of the carriage body 22.

At the front of the carriage body 22, a laterally extending arm 24 is provided so as to cross the longitudinal direction of the carriage body 22. Thus, the carriage body 22 including the arm 24 is entirely T-shaped. A coupling portion 21 provided at the center in the lateral direction of the arm 24 is coupled to the rear end of the preceding transport carriage 20 via the coupler 29. The arm 24 further includes a pair of left and right wheels 28 on the left and right ends of the arm 24. The wheels 28 are rotationally supported by the top surface of the left rail 30L and the top surface of the right rail 30R, respectively.

The arm 24 further includes a pair of left and right side rollers 26L and 26R near the pair of left and right wheels 28. The side rollers 26L and 26R can each rotate about a vertical rotation axis (penetrating the arm 24 in FIG. 2). The outer surface of the left side roller 26L is situated so as to face one side of the left rail 30L whereas the outer surface of the right side roller 26R is situated so as to face one side of the right rail 30R. However, as shown in FIG. 2, the outer surfaces of the side rollers 26L and 26R are not in contact with the rails 30L and 30R and a small gap is kept between the side roller 26L and the rail 30L and between the side roller 26R and the rail 30R in a region where the rails 30L and 30R linearly extend (linear part). When the transport carriage 20 is being deviated from the transportation path by a lateral external force or the like, the side rollers 26L and 26R come into contact with the sides of the rails 30L and 30R so as to limit a lateral movement of the transport carriage 20, thereby keeping the transport carriage 20 in the transportation path.

Figure 3:
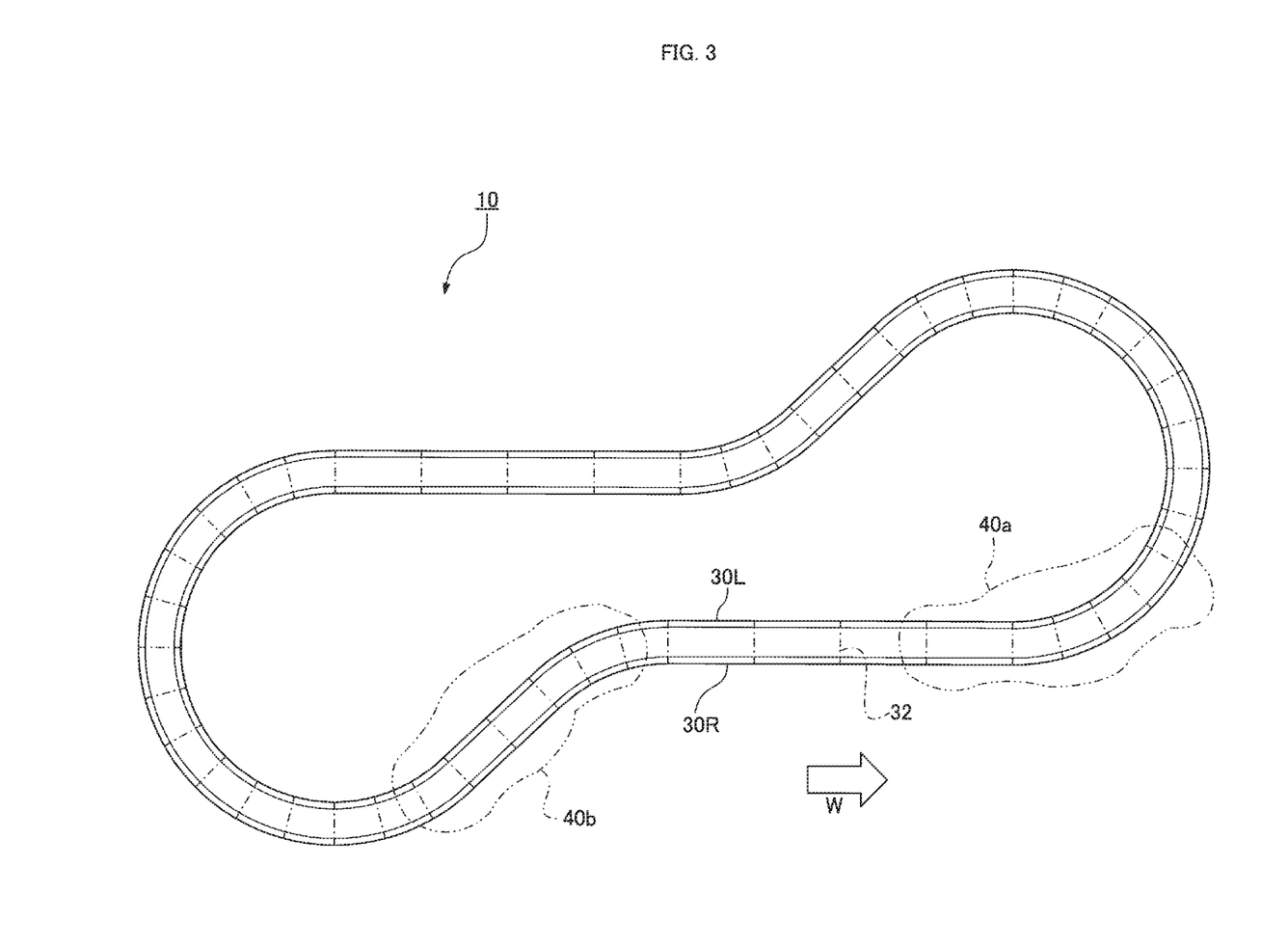
FIG. 3 is a plan view showing a transportation path in the goods transport facility of the present embodiment.

FIG. 3 shows the transportation path where the transport carriages 20 travel in the goods transport facility 10 of the present embodiment. In the goods transport facility 10, the left rail 30L and the right rail 30R are provided along the transportation path. In other words, the transportation path is provided between the left rail 30L and the right rail 30R. In order to prevent the left rail 30L and the right rail 30R from separating from each other, the left and right rails 30L and 30R are coupled to each other via yokes 32 at two or more points in the transportation path.

The transportation path includes curved parts for the curving rails 30L and 30R in addition to linear parts for the linearly extending rails 30L and 30R. According to the direction of a curve, the curved parts can be classified into a left curve where the rails 30L and 30R turn to the left with respect to the traveling direction W and a right curve where the rails 30L and 30R turn to the right with respect to the traveling direction W. Hereinafter, a curving region 40a and an S-curve region 40b in FIG. 3 will be mainly discussed. The curving region 40a is a region between a linear part and a left curve and an example of a transition region from a liner part to a curved part. The S-curve region 40b is a region between a left curve and a right curve and an example of a region where the direction of a curve changes.

Figure 4:
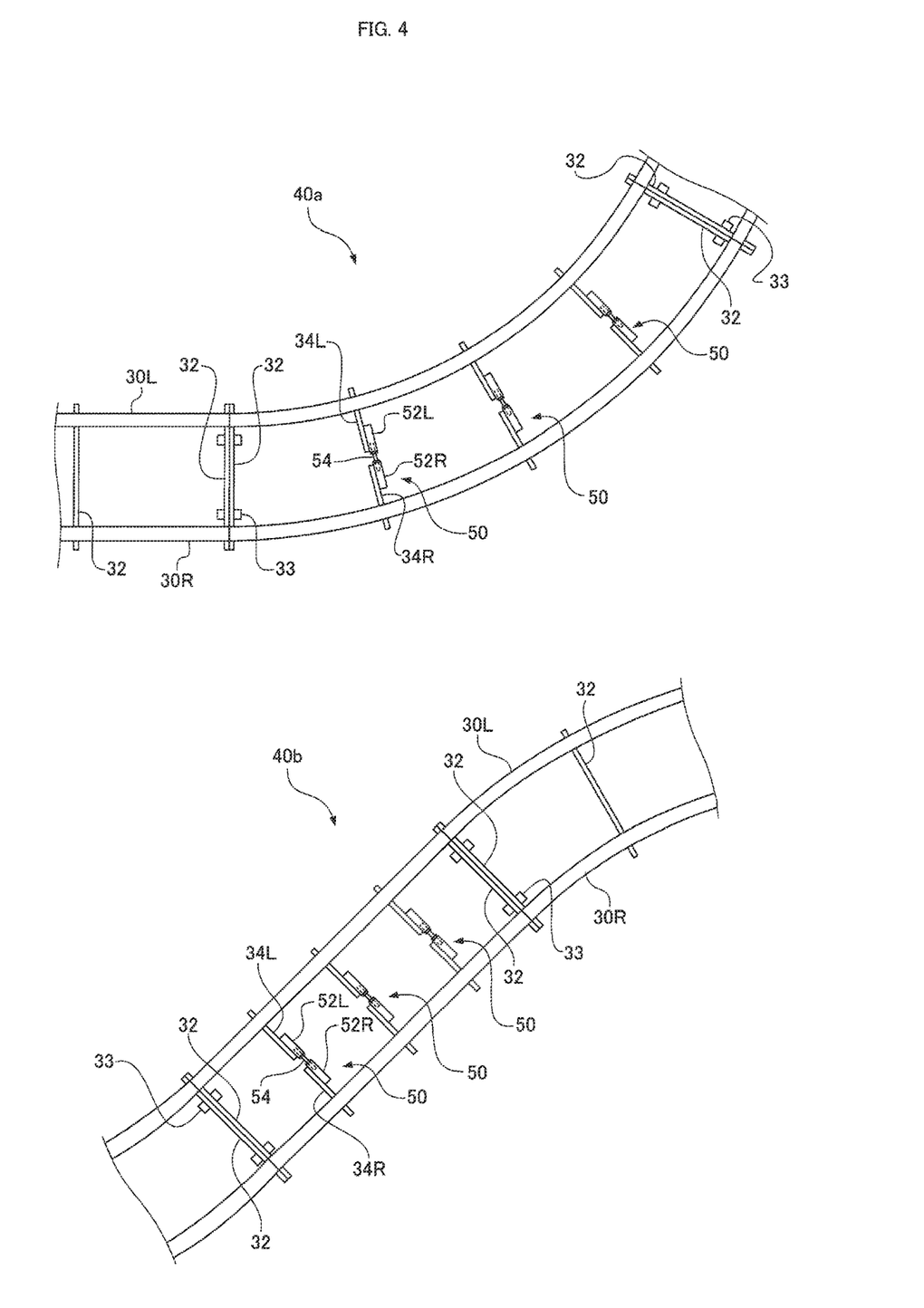
FIG. 4 shows a curved part in the transportation path of the present embodiment, in which a transition region from a linear part to a curved part is illustrated on the upper side and a region where the direction of a curve changes in the curved part is illustrated on the lower side.

The upper enlarged view of FIG. 4 shows the curving region 40a. As shown in FIG. 4, the curving region 40a includes rail width adjusting mechanisms 50 provided as rail width adjusters capable of changing a distance (rail width) between the left and right rails 30L and 30R. The rail width adjusting mechanisms 50 are provided at two or more points in the curving region 40a. The rail width adjusting mechanisms 50 are also provided in the S-curve region 40b illustrated in the lower enlarged view of FIG. 4. As shown in FIG. 4, the rail width adjusting mechanisms 50 are provided at the positions of left and right yokes 34L and 34R split from the yoke 32 that couples the left and right rails 30L and 30R. The left and right rails 30L and 30R are not members integrally formed over the transportation path but include a plurality of rail members connected in the longitudinal direction. As shown in FIG. 4, the rail members are connected to each other via connecting bolts 33. Specifically, the front face of the yoke 32 provided on the front end of the rear rail member is brought into contact with the rear face of the yoke 32 provided on the rear end of the front rail member, and then the yokes 32 are connected to each other via the connecting bolts 33, so that the rail members are connected to each other in the longitudinal direction.

Figure 5:
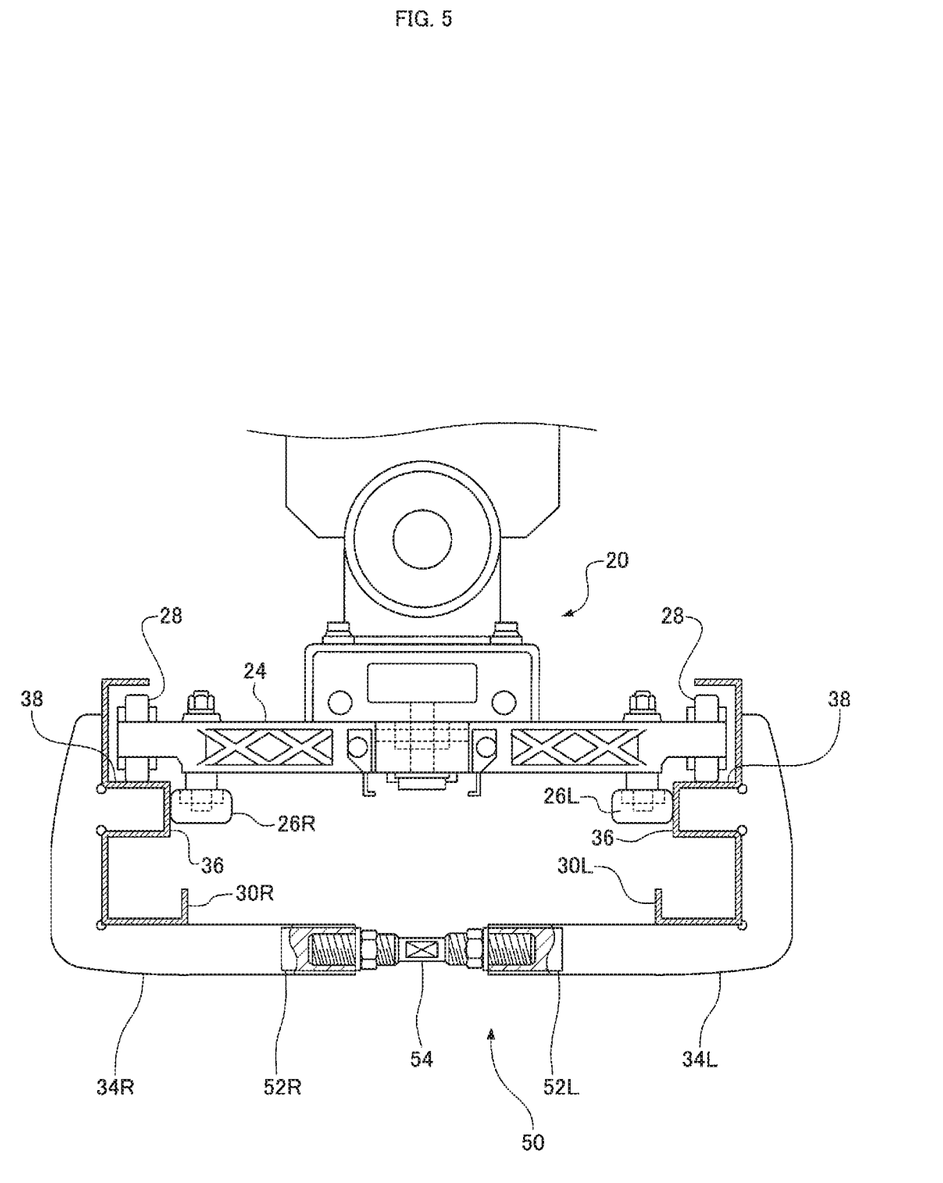
FIG. 5 is a front view showing a carriage body and a rail width adjuster of the present embodiment.

FIG. 5 is a front view of the transport carriage 20, the rails 30L and 30R, and the rail width adjusting mechanisms 50 that are viewed from the front. In the front view of FIG. 5, the constituent elements denoted as "L" are disposed on the right side and the constituent elements denoted "R" are disposed on the left side. The left and right rails 30L and 30R are plate members substantially bent into E shapes in cross section. Specifically, as shown in FIG. 5, the plate member constituting each of the left and right rails 30L and 30R has upper and lower ends that are bent inward in a lateral direction in FIG. 5. The plate member is further bent inward in the lateral direction at a point between the upper and lower ends, forming a middle stage. The top surface of the middle stage serves as a traveling surface 38 that supports the wheel 28. The side of the middle stage serves as a rail side 36 facing the outer surface of each of the side rollers 26L and 26R.

As shown in FIG. 4, the left and right rails 30L and 30R are coupled to each other via the yokes 32. At the position of the rail width adjusting mechanism 50 in FIG. 5, the yoke 32 is divided into the left separate yoke 34L and the right separate yoke 34R. The left and right separate yokes 34L and 34R are laterally fit to the left and right rails 30L and 30R, respectively, from the outside in FIG. 5. The left and right separate yokes 34L and 34R are fixed to the left and right rails 30L and 30R, respectively, with bolts or the like, which are not shown. Thus, when a gap between the left and right separate yokes 34L and 34R is changed, a distance (rail width) between the rails 30L and 30R is also changed. In other words, the left and right separate yokes 34L and 34R act as a pair of left and right positioning members fixed to the left and right rails 30L and 30R, respectively.

In order to easily change a gap between the left and right yoke halves 34L and 34R, the rail width adjusting mechanism 50 in FIG. 5 includes left and right blocks 52L and 52R and a double-end stud 54. The blocks 52L and 52R are rectangular members. The left block 52L is fixed to the left yoke half 34L by welding or with a bolt. Likewise, the right block 52R is fixed to the right yoke half 34R. In the present embodiment, as shown in FIGS. 4 and 5, the left and right blocks 52L and 52R are fixed to the front surfaces of the left and right yoke halves 34L and 34R, respectively.

The double-end stud 54 is disposed between the left and right blocks 52L and 52R. The double-end stud 54 is a long rod member with both ends screwed into the left and right blocks 52L and 52R, respectively. In FIG. 5, parts of the blocks 52L and 52R are virtually cut to show the insides of the blocks 52L and 52R. As shown in FIG. 5, both ends of the double-end stud 54 are threaded in different threading directions (in FIG. 5, a right-handed screw is disposed on the right side a left-handed screw is disposed on the left side). Thus, when an operator rotates the double-end stud 54 about an axis, a gap increases or decreases between the left and right blocks 52L and 52R where both ends of the double-end stud 54 are screwed. This changes a gap between the left and right yoke halves 34L and 34R where the left and right blocks 52L and 52R are fixed, thereby changing a rail width between the left and right rails 30L and 30R. In this way, the rail width adjusting mechanism 50 shown in FIG. 5 can change a rail width between the rails 30L and 30R by rotating the double-end stud 54.

As shown in FIG. 4, the rail width adjusting mechanisms 50 are provided in the curving region 40a and the S-curve region 40b. In the related art, one of the left and right side rollers 26L and 26R is largely separated from the rails 30L and 30R in these regions, whereas in the present embodiment, the rail width adjusting mechanisms 50 are provided so as to change a distance between the rails 30L and 30R. If a rail width is reduced, as shown in FIG. 5, any one of the left and right side rollers 26L and 26R is not separated from the rails 30L and 30R.

Figure 6:
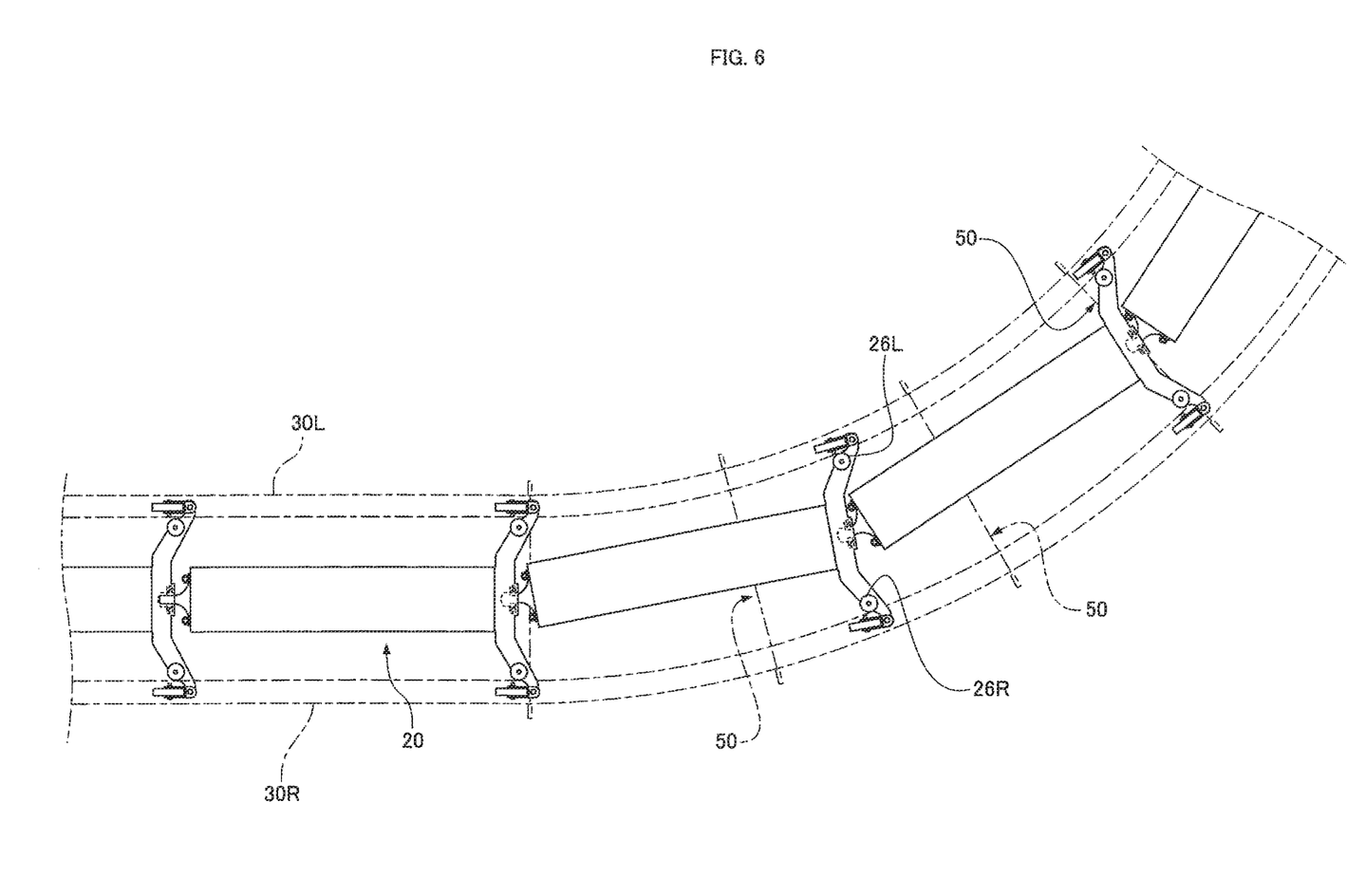
FIG. 6 is a plan view showing the orientations of the transport carriages of the present embodiment in a transition region from a linear part to a curved part.

FIG. 6 shows the orientations of the transport carriages 20 in the curving region 40a if a rail width in the curving region 40a in the upper part of FIG. 4 is reduced by the rail width adjusting mechanism 50. As shown in FIG. 6, a rail width between the left and right rails 30L and 30R is reduced, so that the left and right side rollers 26L and 26R of the transport carriages 20 in this region are all in contact with the left and right rails 30L and 30R unlike in the related art shown in FIGS. 8 and 9. The side rollers 26R on the outer side of the curve (right side), in particular, are not separated from the outer rail 30R.

Noise occurs in the related art of FIGS. 8 and 9 because the outer side roller 96R largely separated from the outer rail 90R collides with the rail 90R with a strong impact obtained in a large gap from the rail 90R before the side roller 96R comes into contact with the rail 90R again. In contrast, in the present embodiment of FIG. 6, the outer side rollers 26R are not largely separated from the outer rail 30R. Thus, the side rollers 26R do not collide with the rail 30R with a strong impact, thereby preventing the occurrence of noise in a transition region from a linear part to a curved part.

Figure 7:
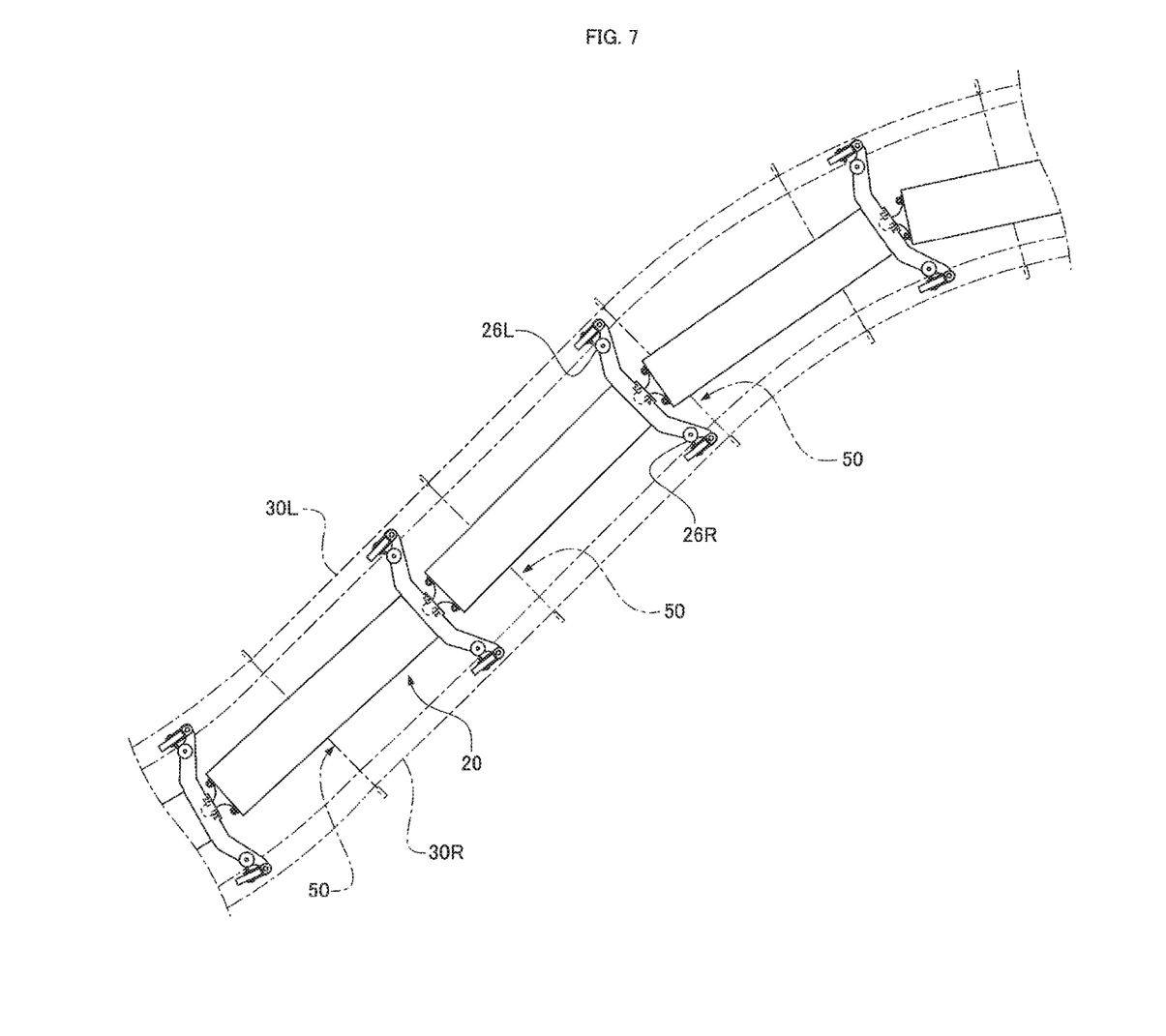
FIG. 7 is a plan view showing the orientations of the transport carriages of the present embodiment in a region where the direction of a curve changes in a curved part.

By using the rail width adjusting mechanism 50 of the present embodiment, noise is prevented also in a region where the direction of a curve changes in a curved part. FIG. 7 shows the orientations of the transport carriages 20 in the S-curve region 40b if a rail width in the S-curve region 40b in the lower part of FIG. 4 is reduced by the rail width adjusting mechanism 50. As shown in FIG. 7, a rail width between the left and right rails 30L and 30R is reduced, so that the left and right side rollers 26L and 26R of the transport carriages 20 in this region are all in contact with the left and right rails 30L and 30R unlike in the related art shown in FIGS. 10 and 11. Specifically, the right side roller 26R is not separated from the right rail 30R in a left curve and the left side roller 26L is not separated from the left rail 30L in a right curve. Thus, in the present embodiment of FIG. 7, the left and right side rollers 26L and 26R are not largely separated from the left and right rails 30L and 30R, so that the side rollers 26L and 26R do not collide with the rails 30L and 30R with a strong impact. This prevents the occurrence of noise in a region where the direction of a curve changes in a curved part.

As has been discussed, in the goods transport facility 10 of the present embodiment, the rail width adjusting mechanisms 50 are provided in the curving region 40a (a transition region from a linear part to a curved part) and the S-curve region 40b (a region where the direction of a curve changes in a curved part) as shown in FIG. 4. This can reduce a rail width in these regions where the side rollers 26L and 26R may be largely separated from the rails 30L and 30R according to the related art. Thus, as shown in FIGS. 6 and 7, the side rollers 26L and 26R can be prevented from largely separating from the rails 30L and 30R. This prevents the side rollers 26L and 26R from colliding with the rails 30L and 30R with a strong impact. Thus, the probability of noise is reduced in a curved part of the transportation path in the goods transport facility 10 of the present embodiment.

In the present embodiment, the curving region 40a and the S-curve region 40b in FIG. 4 are short regions and thus the curvature radius of the transportation path considerably changes in these regions. As has been discussed, the rail width adjusting mechanisms 50 are provided so as to prevent noise caused by the collision of the side rollers 26L and 26R with the rails 30L and 30R. Thus, when a facility designer designs the transportation path, the curving regions 40a and the S-curve region 40b can be short in the layout, increasing the flexibility of the layout of the transportation path.

In the present embodiment, the rail width is adjusted by changing a gap between the yoke halves 34L and 34R of the yoke 32 as shown in FIG. 4. The rail width adjusting mechanism 50 is not limited to this configuration. For example, positioning members such as metal plates may be fixed to the rails 30L and 30R at different positions from the yokes 32 and intervals between the positioning members may be changed. In this case, the rail width adjusting mechanisms 50 can be provided at any positions. Alternatively, the rails 30L and 30R may be moved by directly screwing the double-end studs 54 into the rails 30L and 30R.

In the present embodiment, as shown in FIG. 4, the rail width adjusting mechanisms 50 are provided at the positions of the yokes 32 in the curving region 40a and the S-curve region 40b. If the rail width adjusting mechanisms 50 are provided at any positions on the assumption that the rail width is constant over the transportation path, the rail width adjusting mechanisms 50 are desirably located so as to change the rail width at positions where the side rollers 26L and 26R are largely separated from the rails 30L and 30R. For example, a facility designer simulates the path of the transport carriage 20 on the assumption that the rail width is kept constant in a linear part and a curved part. By examining the predicted paths of the side rollers 26L and 26R according to the simulation, the positions of the side rollers 26L and 26R largely separated from the rails 30L and 30R on the transportation path can be predicted. Moreover, if the rail width can be reduced at positions where the side rollers 26L and 26R are largely separated from the rails 30L and 30R, that is, at positions where gaps between the rails 30L and 30R and the side rollers 26L and 26R are larger than in a linear part, the side rollers 26L and 26R are not largely separated from the rails 30L and 30R, achieving noise prevention. In this case, if the gaps between the side rollers 26L and 26R and the rails 30L and 30R can be predicted by simulation, the rail width is desirably reduced by the rail width adjusting mechanism 50 according to the predicted gaps. If simulation is difficult in a facility provided with the rails 30L and 30R having complicated shapes, a designer may examine the transport carriages 20 actually traveling along the rails 30L and 30R and determine the positions of noise. Thereafter, the rail width adjusting mechanisms 50 may be provided so as to change the rail width at the positions. It is not necessary to provide the rail width adjusting mechanisms 50 at the same positions as the positions where the side rollers 26L and 26R are largely separated from the rails 301 and 30R. This is because a change of the rail width at one point leads to changes of the rail width at preceding and subsequent points. For this reason, if it is difficult to provide the rail width adjusting mechanisms 50 at the same positions as the positions where the side rollers 26L and 26R are largely separated from the rails 30L and 30R, the rail width adjusting mechanisms 50 may be slightly separated from the positions so as to indirectly change the rail width at the positions.

In the present embodiment, the rail width adjuster for changing the rail width is the rail width adjusting mechanism 50 including the double-end stud 54 rotated by an operator. The rail width adjuster is not limited to the rail width adjusting mechanism 50 for manually changing the rail width. For example, an electric rail width adjuster may be used with the double-end stud 54 driven by a motor.

Moreover, in the goods transport facility 10 of the present embodiment, the carriage body 22 travels with the goods 12 supported via the tray 14 as shown in FIGS. 1 and 2. The transported goods 12 may be directly supported on the carriage body 22.

As shown in FIG. 1, each of the transport carriages 20 has the tray 14 in the present embodiment. The tray 14 is tilted so as to discharge the goods 12 into the chute 18. Discharging the goods 12 into the chute 18 is not limited to this method. For example, if the tray 14 on the top surface of the transport carriage 20 is replaced with a belt conveyor or a roller conveyor that can move the goods 12 so as to cross the transport direction W and the transport carriage 20 is adjacent to the target chute 18, the belt conveyor or the roller conveyor on the top surface may be driven so as to discharge the goods 12 into the chute 18.

REFERENCE SIGNS LIST 10 goods transport facility
20 transport carriage
26L side roller
26R side roller
30L rail
30R rail
32 yoke
34L yoke half
34R yoke half
50 rail width adjusting mechanism

What is claimed is:

1. A goods transport facility for transporting goods along a transportation path including a linear part and a curved part,
the goods transport facility comprising:
a pair of left and right rails provided along the transportation path; and
a plurality of transport carriages configured to move along the rails so as to transport goods,
wherein each of the transport carriages includes a carriage body that supports the goods, a pair of left and right wheels that rotate around a first axis of rotation while being supported by top surfaces of the rails, and a pair of left and right side rollers that rotate around a second axis of rotation that is different from the first axis of rotation, the pair of left and right side rollers being located to face sides of the rails and limit a lateral movement of the carriage body, and each of the transport carriages is coupled to the preceding and subsequent transport carriages in a swinging manner so as to be a train of the transport carriages consecutively traveling along the transportation path, and
a rail width adjuster capable of changing a rail width between the left and right rails is provided in at least one of a curving region being transition from the linear part to the curved part while the transport carriages entering the curved part of the transportation path and a region where a direction of a curve changes in the curved part.

2. The goods transport facility according to claim 1, wherein a gap between a pair of left and right positioning members fixed to the respective left and right rails is changed by the rail width adjuster so as to change the rail width.

3. The goods transport facility according to claim 2, wherein the pair of left and right positioning members is yoke halves for coupling the left and right rails.

4. The goods transport facility according to claim 1, wherein the rail width adjuster is located so as to change a rail width at a position where a gap between the rail and the side roller is larger than that of the linear part.

* * * * *